(12) United States Patent
Brunson

(10) Patent No.: US 8,479,406 B2
(45) Date of Patent: *Jul. 9, 2013

(54) LENGTH REFERENCE BAR SYSTEM AND METHOD

(75) Inventor: Deighton Brunson, Lees Summit, MO (US)

(73) Assignee: Brunson Instrument Company, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/431,188

(22) Filed: Mar. 27, 2012

(65) Prior Publication Data

US 2012/0233871 A1 Sep. 20, 2012

Related U.S. Application Data

(63) Continuation of application No. 12/131,893, filed on Jun. 2, 2008, now Pat. No. 8,141,264.

(60) Provisional application No. 60/941,231, filed on May 31, 2007.

(51) Int. Cl.
*G01B 5/14* (2006.01)
*G01B 3/30* (2006.01)

(52) U.S. Cl.
USPC ................................................ 33/702; 33/704

(58) Field of Classification Search
USPC .................... 33/702, 704, 706, 708, DIG. 19, 33/502, 573, 567, 568, 559, 560, 558.2; 73/1.79
See application file for complete search history.

(56) References Cited

U.S. PATENT DOCUMENTS

| 4,843,729 | A  | * | 7/1989  | Nagaoka et al. | 33/708  |
|-----------|----|---|---------|----------------|---------|
| 4,932,136 | A  | * | 6/1990  | Schmitz et al. | 33/502  |
| 4,949,469 | A  | * | 8/1990  | Wachtler       | 33/702  |
| 4,991,311 | A  | * | 2/1991  | Nagaoka et al. | 33/708  |
| 5,016,359 | A  | * | 5/1991  | Nagaoka et al. | 33/702  |
| 5,253,430 | A  | * | 10/1993 | Rieder et al.  | 33/702  |
| 6,293,028 | B1 | * | 9/2001  | Sylvia         | 33/613  |
| 6,308,431 | B1 | * | 10/2001 | Takanashi et al.| 33/708 |
| 6,662,461 | B2 | * | 12/2003 | McMurtry       | 33/558.2|
| 6,836,323 | B2 | * | 12/2004 | Schmadel       | 33/502  |
| 6,964,113 | B2 | * | 11/2005 | Bridges et al. | 33/702  |
| 7,188,428 | B2 | * | 3/2007  | Blondeau       | 33/502  |
| 7,197,834 | B2 | * | 4/2007  | Heimer         | 33/502  |
| 8,051,575 | B2 | * | 11/2011 | Bridges et al. | 33/502  |
| 2002/0148133 | A1 | * | 10/2002 | Bridges et al. | 33/702 |
| 2004/0036867 | A1 | * | 2/2004  | Jedamzik et al.| 356/243.1|
| 2008/0295352 | A1 | * | 12/2008 | Brunson        | 33/702  |
| 2012/0233871 | A1 | * | 9/2012  | Brunson        | 33/701  |

* cited by examiner

*Primary Examiner* — Yaritza Guadalupe-McCall
(74) *Attorney, Agent, or Firm* — Bryan P. Stanley; Kutak Rock LLP

(57) ABSTRACT

A length reference bar system and method that compensates for thermal expansion and allows for testing whether an instrument is working properly using only an inferometer. The system has a bar portion with end caps for target positions on either end of the bar portion that extend inward toward each other such that, if a length of the bar portion changes due to a temperature change, a length of the end caps also changes in an opposite direction to counteract the bar portion length change. Any target positions mounted on the end caps remain at a constant distance from each other regardless of the temperature thereby canceling out the effect of thermal expansion. The end caps also provide multiple target positioning capability so that any targets mounted thereon may be positioned in various configurations to provide a user with increased versatility for applications such as checking calibration.

13 Claims, 3 Drawing Sheets

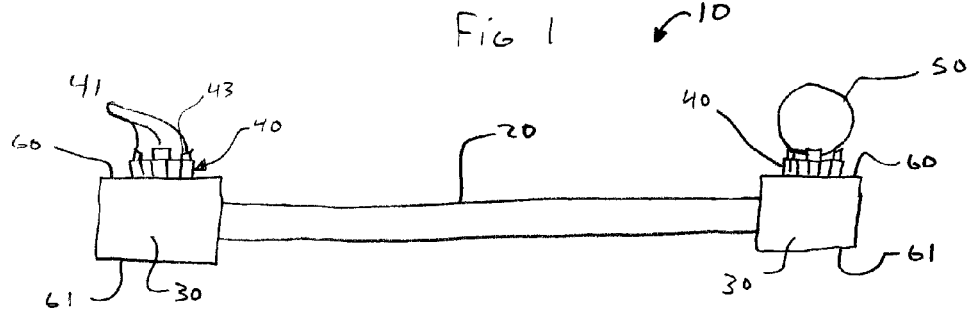
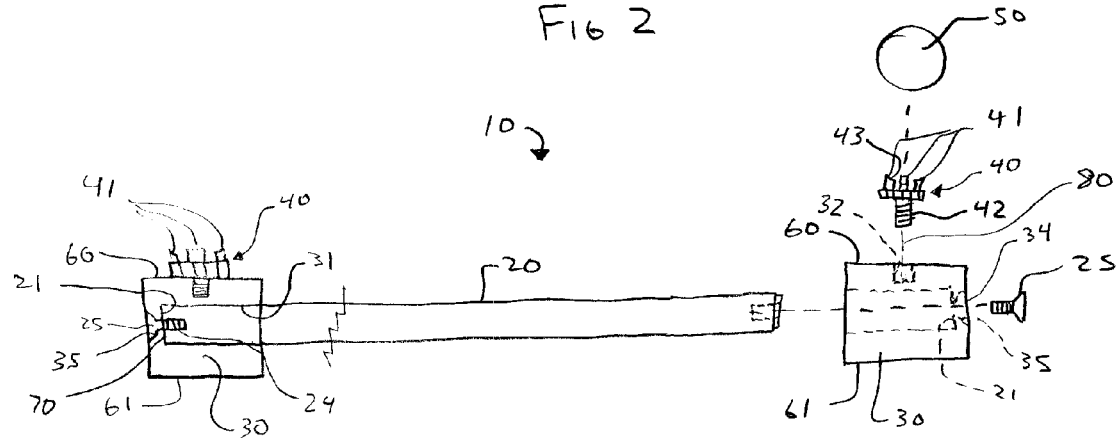

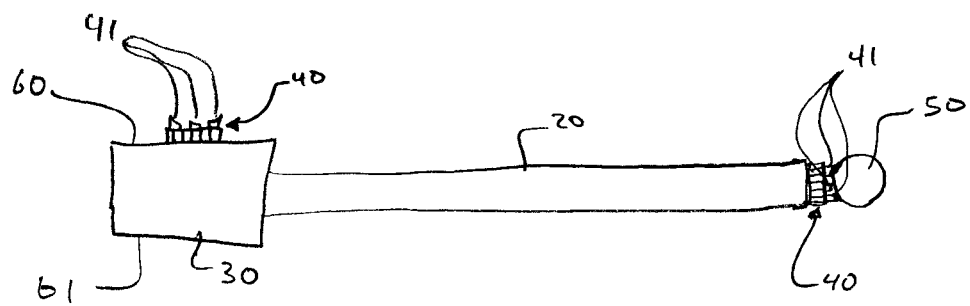
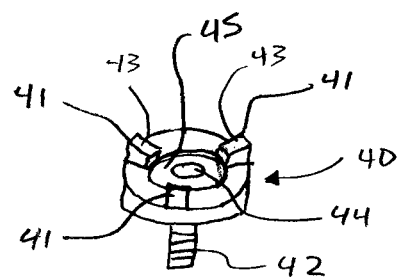

LENGTH REFERENCE BAR SYSTEM AND METHOD

CROSS-REFERENCE TO RELATED APPLICATION

This application for patent is a continuation of U.S. application Ser. No. 12/131,893, now U.S. Pat. No. 8,141,264, which claims the benefit of priority from U.S. provisional Patent Application Ser. No. 60/941,231 filed May 31, 2007, the disclosures of which are incorporated herein by reference in their entireties.

BACKGROUND OF THE INVENTION

1. Field of the Invention

The present general inventive concept relates to a length reference bar system and method to test measuring equipment, and in particular, to a length reference bar system and method to test, calibrate, check calibration, and/or check stability during use of high precision instruments such as laser trackers, scanners and the like.

2. Description of the Related Art

A large number of industries require precise and accurate measuring for a number of applications such as production, manufacturing, and process control. In many such applications, measurement errors on the order of even one ten-thousandth of an inch can be critical. Instruments such as laser trackers, scanners and the like are particularly well suited for such applications because they provide extreme precision and accuracy. Nevertheless, as with any measuring device, laser trackers, scanners and the like must be calibrated and used properly to benefit from the high precision and accuracy capabilities of those instruments.

As is the case with calibration (or verifying proper calibration) of virtually any measuring instrument, checking calibration of a laser tracker or of a scanner is typically accomplished by measuring an object (such as a length reference bar) of a standard, known length and confirming that the instrument measures the appropriate length. In particular, such bars are used to verify whether a laser tracker instrument is yielding trustworthy results (i.e. demonstrating that it is properly calibrated) or used during a measurement job to establish whether anything has gone wrong during the course of the job. For example, a user of the instrument will measure the length reference bar at the beginning, middle, and end of a job. If the user obtains the same length measurement each time, the user will have a degree of comfort that the tracker has maintained a proper adjustment and/or position during the measurement.

Length bars are built and calibrated according to various specification standards such as governmental standards or engineering society standards. Unfortunately, most length reference bars are designed and calibrated for use only within a specified temperature range. This is due to the natural phenomenon of thermal expansion, which causes all materials to expand and contract when the materials are subjected to increases and decreases in temperature. Thus, laser tracker or scanner users must often check calibration of their instruments at temperatures substantially different than the environment in which they will be working, or must otherwise account for temperature variations when checking calibration. All alternatives are often impractical if not impossible, and furthermore tend to result in at least a slight degree of inaccuracy and/or imprecision.

Several length reference systems have been developed that include structural arrangements that are designed to counteract length increases caused by thermal expansion. For example, U.S. Pat. No. 6,836,323, the entire disclosure of which is incorporated herein by reference, discloses a length reference system which includes a compensating member that connects the wall of a bar to the wall of a probe attachment that slides within the bar. The compensating member is designed to increase in length by an amount equal to the combined length increase of the bar and the probe attachment. As the compensating member increases in length, it causes the probe attachment to slide inward in the hollow bar compensating for the length increase of the bar and the probe attachment. While this arrangement does cancel out the thermal expansion of the bar, it requires that the probe, or target which marks the point of reference for location by a laser tracker or scanner, be located along the axis of the length reference bar. As a result it is not possible to align a laser tracker's beam with the bar to use the inferometer alone to check calibration. Not doing so may lead to Az or El encoder contributions to error. Furthermore, the aligned-probe arrangement requires that any thermal expansion of the probe, as well as any members connecting the probe to the probe attachment, also be canceled out by the expansion of the compensating member.

Other length reference systems that have been designed to counteract length increases caused by thermal expansion are disclosed in U.S. Pat. Nos. 6,505,495 and 7,188,428, the entire disclosures of which are incorporated herein by reference. Like the system disclosed in U.S. Pat. No. 6,836,323, these systems include probes that are located axially with the length reference bar, preventing the ability to check calibration using the inferometer of a laser tracker alone and adding to the complexity of design and manufacturing of the reference bar.

Therefore, it is desirable to provide a length reference bar system and method that compensates for thermal expansion, tests whether an instrument is working properly using an inferometer alone, is easy to manufacture, and is simple to use.

SUMMARY OF THE INVENTION

The present general inventive concept provides an improved length reference bar. The present general inventive concept further provides an improved length reference bar that compensates for thermal expansion of materials.

The present general inventive concept also provides a length reference bar that may be used to test whether an instrument is working properly using an inferometer alone.

The present general inventive concept also provides a length reference bar that compensates for thermal expansion of materials, that is easy to manufacture, and/or simple to use.

The present general inventive concept also provides a length reference bar having a plurality of elements that cooperate to maintain targets mounted on the length reference bar at a same distance from each other regardless of any thermal expansion of the length reference bar.

The present general inventive concept also provides a length reference bar having a plurality of elements that move in opposite directions to counteract thermal expansion.

The present general inventive concept also provides a length reference bar having end caps with opposing target positions on either end of a bar portion that, as temperature increases and increases a length of the bar portion and pushes the opposing target positions away from each other, a length portion of the end caps that extends inward from ends of the bar portion also increases to counteract the bar portion increase such that a location of the target positions on the end caps remains constant, i.e., the target positions, by moving further inward toward the center of the bar portion, provide an inward movement of the target positions to equal and thus cancel out the length increase of the bar portion, such that the distance between the target positions remains constant regardless of the temperature.

The present general inventive concept also provides a length reference bar having end caps having multiple target positioning capability so that any targets mounted thereon may be positioned in various configurations to provide a user with increased versatility for applications such as testing whether an instrument is working properly using only an inferometer.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a length reference bar system having thermal-expansion cancellation means to maintain a predefined distance between two target mounts, the system including an elongated connecting element to provide a reference, the connecting element having first and second ends, and first and second thermal-expansion cancellation elements mounted to the first and second ends of the connecting element, wherein the two target mounts may be selectively mounted on the first and second thermal-expansion cancellation elements to accommodate a target.

Wherein the target mounts may be mounted along coplanar surfaces of the first and second thermal-expansion cancellation elements.

Wherein the two target mounts may be situated between the first and second ends of the connecting element.

Wherein one of the two target mounts may be mounted to one of the first and second ends of the connecting element instead of one of the first and second thermal-expansion cancellation elements.

The length reference bar system may further include a bore in one of the first and second thermal-expansion cancellation elements to accommodate a fastening element.

Wherein the first and second thermal-expansion cancellation elements extend around an outer perimeter of the connecting element.

Wherein the connecting element may extend into a cavity of each of the thermal-expansion cancellation elements.

Wherein each of the first and second thermal-expansion cancellation elements may be only secured to the connecting element at an interior abutment surface within the first and second thermal-expansion cancellation elements.

Wherein the connecting element and each of the first and second thermal-expansion cancellation elements are fixedly attached at a single point of contact proximate to the first and second ends of the connecting element.

Wherein the thermal-expansion cancellation elements may be adjustably mounted to the connecting element to permit alignment of top surfaces of each of the thermal-expansion cancellation elements.

Wherein the target mounts may be magnetic.

Wherein the target mounts may have three protrusions to abut the target.

Wherein the target mounts may have three protrusions to position the target above a magnet.

Wherein the three protrusions may prevent the target from contacting the magnet.

The length reference bar system may further include threaded shafts extending from each of the target mounts, wherein the threaded shafts may be sized and shaped to engage threaded bores in the thermal-expansion cancellation elements.

The length reference bar system may further include apertures through end surfaces of the thermal-expansion cancellation elements, bores in end surfaces of the connecting element, wherein screws may affix the thermal-expansion cancellation elements to the connecting element via passing through the apertures and into the bores.

Wherein the threaded shafts may be sized and shaped to engage the bores.

The foregoing and/or other aspects and utilities of the present general inventive concept may further be achieved by providing a method of using a length reference bar system having thermal-expansion cancellation means to maintain a predefined distance between two target mounts, the method including providing a reference via an elongated connecting element having first and second ends, mounting first and second thermal-expansion cancellation elements to the first and second ends of the connecting element, and mounting target mounts to each of the first and second thermal-expansion cancellation elements to each accommodate a target on a common plane defined by the target mounts.

The method may further include taking a first measurement along a longitudinal axis of the reference bar of a target positioned on and along the common plane defined by the target mounts.

The method may further include removing a target from one of the target mounts, and taking a second measurement along the longitudinal axis of the reference bar.

The method may further include comparing the first measurement to the second measurement to yield a result.

The method may further include comparing the result to a predefined factor to determine whether an instrument is working properly.

The method may further include the step of moving a target from one of the target mounts to the other target mount to accomplish said taking a first and second measurement steps.

The foregoing and/or other aspects and utilities of the present general inventive concept may further be achieved by providing a length reference bar system having thermal-expansion cancellation means to maintain a predefined distance between two target mounts, the system including an elongated connecting element to provide a reference, the connecting element having first and second ends, and at least a first thermal-expansion cancellation element mounted to one of the first and second ends of the connecting element, wherein the two target mounts may be selectively mounted on the at least first thermal-expansion cancellation element or one of the first and second ends of the connecting element to accommodate a target.

Said at least first thermal-expansion cancellation element may include first and second thermal-expansion cancellation elements mounted to the first and second ends of the connecting element.

The foregoing and other objects are intended to be illustrative of the present general inventive concept and are not meant in a limiting sense. Many possible embodiments of the present general inventive concept may be made and will be readily evident upon a study of the following specification and accompanying drawings comprising a part thereof. Various features and subcombinations of present general inventive concept may be employed without reference to other features and subcombinations. Other objects and advantages of this present general inventive concept will become apparent from the following description taken in connection with the accompanying drawings, wherein is set forth by way of illustration and example, an embodiment of this present general inventive concept.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 1 is a front elevation view of an embodiment of the present general inventive concept illustrating a length reference bar having two end caps.

FIG. 2 is a partially exploded cross sectional view of embodiment of FIG. 1 illustrating a length reference bar wherein each end of a tubular bar portion is positioned within a tubular cavity of two end caps.

FIG. 5 is a side elevation view of the embodiment of the present general inventive concept of FIG. 1 illustrating the length reference bar having one end cap removed and replaced with a target positioning mount.

FIG. 6 is a perspective view of an embodiment of the present general inventive concept illustrating a mount with magnet and protrusions.

DETAILED DESCRIPTION OF THE PREFERRED EMBODIMENTS

Figure 3:
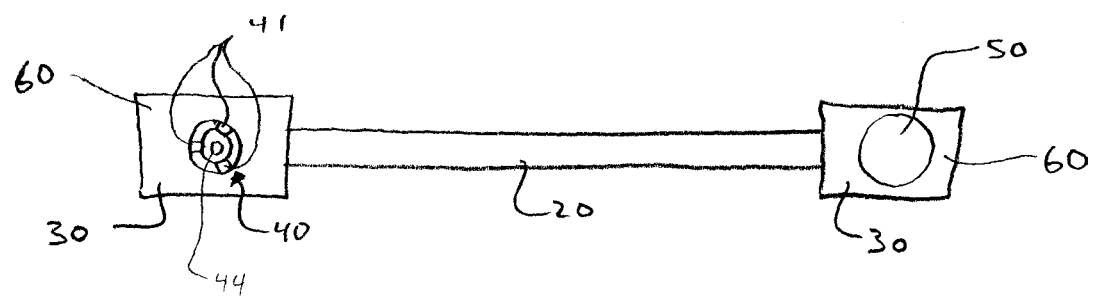
FIG. 3 is a top plan view of the embodiment of FIG. 1.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

As illustrated in FIG. 1, a length reference bar 10 includes an elongated connecting element or generally tubular bar portion 20 to connect to two generally square end caps 30. The end caps 30 are each attached to an end of the bar portion 20 and extend inward, i.e., toward the center of the bar portion from the end, along the exterior of the bar portion 20. The end caps 30 are thermal-expansion cancellation elements, which use thereof will be discussed in further detail below.

In an exemplary embodiment, both of the end caps 30 are utilized, attached to opposing ends of the bar portion 20. Nevertheless, it will be appreciated that only one of the end caps 30 may be utilized without departing from the spirit and scope of the present general inventive concept. Further, it will be appreciated that the size, shape construction and materials of the end caps 30 of the exemplary embodiment may be virtually identical to one another or alternatively may differ from one another in any manner, depending upon the desired application.

Each of the end caps 30 include target-positioning mounts 40, which in the exemplary embodiment, the mounts 40 are magnetic nests. The mounts 40 are located on an exterior position of one or both of the end caps 30 at a position spaced inward from the end of the bar portion 20. The mounts 40 are designed to securely, yet releasably hold a target 50 and includes three protrusions 41 about a radius of each of the mounts 40 to support the target 50 in a precise position thereon.

In the exemplary embodiment, each of the mounts 40 provide a magnetic base 44 for a target 50 such as a spherically mounted retro-reflector (SMR) 50 or other similar target and/or probe attached to the exterior of the end caps 30 or to the exterior of the bar portion. These elements cooperate so that a single target 50 may be used. Specifically, the target 50 may be moved from one of the mounts 40 to another of the mounts 40 to permit axial checking of whether an instrument is working properly using the inferometer alone.

Each of the three protrusions 41 have an angled target accommodation surface 43 to provide maximum contact between the three protrusions 41 and target 50. The three protrusions position the target 50 at a center of each of the mounts 40 and at a distance slightly above yet not contacting the magnetic base 44 that is flush with a recessed surface 45, as illustrated in FIGS. 3 and 6. The distance may vary depending on the magnetic base 44 and magnetic strength thereof, but is sufficient to permit the target 50 to be easily rotated to a desired position by a user with minimal frictional resistance yet secure magnetic engagement.

It will be appreciated that the target 50 may be permanently and adjustably or non-adjustably attached via a magnetic or non-magnetic nest (not illustrated) and/or otherwise located at one or both target positions in any like manner without departing from the spirit and scope of the present general inventive concept.

It will further be appreciated that other like targets, other than an SMR target, may be used without departing from the spirit and scope of the present general inventive concept, including but not limited to photogrammetric targets, i.e., optical icons used in measurements which are acquired by photography and analyzed by software. Further still, it will be appreciated that although a single target is depicted in the embodiment shown herein, multiple targets may be utilized without departing from the spirit and scope of the instant invention.

Figure 4:
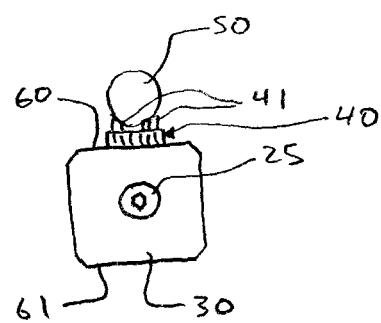
FIG. 4 is a side elevation view of the embodiment of FIG. 1.

Referring to FIGS. 2 and 4, each end of the tubular bar portion 20 is positioned within a generally tubular cavity 31 of the generally square end caps 30. Each end cap 30 is connected to each end of bar portion 20 using screws 25 which extend through bore 34 of end cap 30 and into threaded receiver portion 24, which extends into an interior 21 of the bar portion 20.

The bore 34 of each end cap 30 has a tapered portion 35 to allow screw 25 to counter-sink and thus lie flush with the outer edge of end cap 30 when assembled.

Each of the mounts 40 are attached to a top portion 60, which is located on a surface opposite to a base surface 61 of the end cap 30. The mounts 40 are attached using a threaded connection between a threaded portion 42 of each of the mounts 40 and threaded bore 32 that extends through the top portion 60 of end cap 30, as illustrated in FIG. 2.

In the exemplary embodiment, threads of threaded portion 42 are identically sized and shaped to correspond with threads of screw 25 so that one or more of the mounts 40 may be removed from the top portion 60 of the end cap 30 and attached directly to an end 70 of bar portion 20 as illustrated in FIG. 6. Specifically, at least one of the mounts 40 is removed from the end cap 30. The end cap 30 is removed from the bar portion 20 to expose the end 70 of bar portion 20. The one of the mounts 40 may then be attached onto the end 70 of the bar portion 20 in place of the end cap 30.

Although the bar portion 20 is described with respect to the exemplary embodiment as being tubular and the end caps 30 are described as being generally square, it will be appreciated that the bar portion 20 and/or either or both of the end caps 30 may be utilized with other shapes without departing from the spirit and scope of the present general inventive concept. For instance, the end caps 30 may be triangular.

It will further be appreciated that other types of target positioning mounts similar to mounts 40 may be used as well as alternative methods of mounting targets 50 to the end caps 30 and/or of mounting the end caps 30 to the bar portion 20 without departing from the spirit and scope of the present general inventive concept.

To determine whether an instrument is working properly using the present general inventive concept, a number of measurements are taken with respect to one or more locations of the mounts 40 with respect to the reference bar 10.

The location of the mounts 40 with respect to the reference bar 10 are determined based upon the coefficient of expansion of the bar portion 20, the length of the bar portion 20, and the coefficient of expansion of the end cap 30 such that one of the mounts 40 will always remain a fixed distance from another of the mounts 40 located on an opposing end of the bar portion 20, i.e., located directly on the bar portion 20 or located on an end cap 30 attached to the bar portion 20.

In the exemplary embodiment, the bar portion 20 is made of a material having a first coefficient of expansion and the end caps 30 are made of a material having a second coefficient of expansion. In the exemplary embodiment, the coefficient of expansion for the bar portion 20 is less than the coefficient of expansion for the end caps 30 such that the end caps 30 may be made to have a length significantly shorter than the bar portion 20 and still counteract the expansion of the bar portion 20.

In the exemplary embodiment, the bar portion 20 of the length reference bar 10 of the present general inventive concept is an alloy of iron and nickel having a low coefficient of thermal expansion, such as the material sold under the trademark "Inver." The end caps 30 are made of aluminum in the exemplary embodiment. It will be appreciated that like materials, including materials having positive or negative coefficients of expansion, may be utilized without departing from the spirit and scope of the present general inventive concept.

A distance from the end 70 of the bar portion 20 to a location in which a center 80 of each of the mounts 40 is to be positioned on end cap 30 is calculated based upon a length of the bar portion 20 and coefficients of expansion for the bar portion 20 and the end caps 30 using the following equation: $L2 = L1(COE1)/2(COE2)$.

It will be appreciated that the above equation may be algebraically manipulated so that various desired design parameters may be obtained for reference bar 10. For example, the above equation may be algebraically altered to determine required L1 and L2 if a desired distance between each of the mounts 40 is to 30 inches.

Accordingly, the design of the bar portion 20 of the present general inventive concept allows the targets 50 to be oriented directly in line with a laser beam of a laser tracker (not illustrated), allowing measurements to be taken with the inferometer (not illustrated) only.

A first measurement is taken along a longitudinal axis of the reference bar 10 of one of the targets 50 positioned on one of the mounts 40 and along a common plane defined by the mounts 40. Next, a second measurement is taken along the longitudinal axis of the reference bar 10 with another of the targets 50 positioned on the other of the mounts 40 and along the common plane defined by the mounts 50. The first measurement is compared to the second measurement to yield a result, which is then compared to a predefined factor, for example, a known length of the reference bar 10, the bar portion 20, and/or any other element or combination of elements for which one or more measurements are known. If the result matches the predefined factor, then the user may be comforted with the knowledge that the instrument is working properly.

The extreme precision of the inferometer allows the user to not only check whether an instrument is working properly, but also allows the user to certify the length of the reference bar 10 itself. This allows the user to compare several different measurements thereby providing a higher degree of accuracy and comfort that any instrument used therewith is functioning properly.

The reference bar 10 of the present general inventive concept may be utilized in the manner described above with respect to conventional bars uses. Likewise, the design of the bar portion 20 of the present general inventive concept allow the bar portion 20 to be held in different orientations around a laser tracker (not illustrated) to verify a tracker's ability to accurately measure in all parts of its measurement volume.

Although a few embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A length reference bar system having thermal-expansion cancellation means to maintain a predefined distance between two target mounts, the system comprising:
    an elongated connecting element to provide a reference, the connecting element having first and second ends; and
    first and second thermal-expansion cancellation elements mounted to the first and second ends of the connecting element,
    wherein the two target mounts are selectively mounted on the first and second thermal-expansion cancellation elements to accommodate a target.

2. The length reference bar system according to claim 1, wherein the target mounts are mounted along co-planar surfaces of the first and second thermal-expansion cancellation elements.

3. The length reference bar system according to claim 1, wherein the two target mounts are situated between the first and second ends of the connecting element.

4. The length reference bar system according to claim 1, wherein one of the two target mounts is mounted to one of the first and second ends of the connecting element instead of to one of the first and second thermal-expansion cancellation elements.

5. The length reference bar system according to claim 1, wherein the first and second thermal-expansion cancellation elements extend around an outer perimeter of the connecting element.

6. The length reference bar system according to claim 1, wherein the connecting element extends into a cavity of each of the thermal-expansion cancellation elements.

7. The length reference bar system according to claim 1, wherein each of the first and second thermal-expansion cancellation elements are only secured to the connecting element at an interior abutment surface within the first and second thermal-expansion cancellation elements.

8. The length reference bar system according to claim 1, wherein the connecting element and each of the first and second thermal-expansion cancellation elements are fixedly attached at a single point of contact proximate to the first and second ends of the connecting element.

9. The length reference bar system according to claim 1, wherein the thermal-expansion cancellation elements are adjustably mounted to the connecting element to permit alignment of top surfaces of each of the thermal-expansion cancellation elements.

10. The length reference bar system according to claim 1, wherein the target mounts are magnetic.

11. The length reference bar system according to claim 1, further comprising:
    threaded shafts extending from each of the target mounts, wherein the threaded shafts are sized and shaped to engage threaded bores in the thermal-expansion cancellation elements.

12. The length reference bar system according to claim 1, further comprising:
    apertures through end surfaces of the thermal-expansion cancellation elements; and
    bores in end surfaces of the connecting element;
    wherein screws affix the thermal-expansion cancellation elements to the connecting element via passing through the apertures and into the bores.

13. A method of using a length reference bar system having thermal-expansion cancellation means to maintain a pre-defined distance between two target mounts, the method comprising:
    providing a reference via an elongated connecting element having first and second ends;
    mounting first and second thermal-expansion cancellation elements to the first and second ends of the connecting element; and
    mounting target mounts to each of the first and second thermal-expansion cancellation elements to each accommodate a target on a common plane defined by the target mounts.

* * * * *